(12) United States Patent
Saito et al.

(10) Patent No.: US 9,181,444 B2
(45) Date of Patent: Nov. 10, 2015

(54) LIGHT-CURABLE INK COMPOSITION FOR INK JET RECORDING AND INK JET RECORDING METHOD USING THE SAME

(71) Applicant: Seiko Epson Corporation, Tokyo (JP)

(72) Inventors: Toru Saito, Yamagata-mura (JP); Hiroshi Fukumoto, Shiojiri (JP); Hiroki Nakane, Matsumoto (JP); Hiroaki Kida, Shiojiri (JP); Keitaro Nakano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 75 days.

(21) Appl. No.: 13/689,923

(22) Filed: Nov. 30, 2012

(65) Prior Publication Data
US 2013/0141504 A1 Jun. 6, 2013

(30) Foreign Application Priority Data

Dec. 1, 2011 (JP) ................................. 2011-263446
Feb. 8, 2012 (JP) ................................. 2012-024889

(51) Int. Cl.
*B41J 2/015* (2006.01)
*C09D 11/107* (2014.01)
*B41J 11/00* (2006.01)
*C09D 11/101* (2014.01)
*C09D 11/322* (2014.01)

(52) U.S. Cl.
CPC ............. *C09D 11/107* (2013.01); *B41J 11/002* (2013.01); *C09D 11/101* (2013.01); *C09D 11/322* (2013.01)

(58) Field of Classification Search
CPC ............ B41J 2/01; B41J 2/21; B41J 11/0015; B41J 11/002; B41J 11/101; B41J 11/30; B41J 11/322; B41J 11/40

USPC ................... 347/95–100, 102; 523/160, 161; 106/31.13, 31.6
See application file for complete search history.

(56) References Cited

U.S. PATENT DOCUMENTS

| 2009/0041946 A1* | 2/2009 | Fukumoto et al. ............. 427/511 |
| 2009/0136680 A1* | 5/2009 | Kishi et al. ..................... 427/511 |
| 2009/0197988 A1* | 8/2009 | Kito et al. ........................ 522/26 |
| 2009/0280302 A1 | 11/2009 | Fukumoto et al. |
| 2010/0174013 A1 | 7/2010 | Sugita et al. |
| 2010/0313782 A1 | 12/2010 | Loccufier et al. |
| 2011/0234680 A1* | 9/2011 | Aoyama et al. ................. 347/20 |
| 2012/0083545 A1* | 4/2012 | Kida et al. ....................... 522/26 |

FOREIGN PATENT DOCUMENTS

| EP | 2 053 103 A1 | 4/2009 |
| JP | 2009-001691 A | 1/2009 |
| JP | 2009-057548 A | 3/2009 |
| JP | 2010-260281 A | 11/2010 |
| JP | 2011-500932 A | 1/2011 |
| WO | 2009-053348 A1 | 4/2009 |

* cited by examiner

*Primary Examiner* — Matthew Luu
*Assistant Examiner* — Rut Patel
(74) *Attorney, Agent, or Firm* — Nutter McClennen & Fish LLP; John J. Penny, Jr.; Taylor M. Coon

(57) ABSTRACT

A light-curable ink composition for ink jet recording contains a coloring material, a polymerizable compound, and a photopolymerization initiator. The coloring material contains at least C.I. Pigment Yellow 155, and the polymerizable compound contains at least a vinyl-ether-containing (meth)acrylate represented by general formula (I) below:

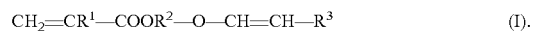

$$CH_2=CR^1-COOR^2-O-CH=CH-R^3 \qquad (I).$$

The vinyl-ether-containing (meth)acrylate is present in an amount of 10 to 67% by mass relative to the total mass of the ink composition.

14 Claims, No Drawings

LIGHT-CURABLE INK COMPOSITION FOR INK JET RECORDING AND INK JET RECORDING METHOD USING THE SAME

BACKGROUND

1. Technical Field

The present invention relates to a light-curable ink composition for ink jet recording and an ink jet recording method using this ink composition.

2. Related Art

To be of high quality and excellent color reproduction, color images formed by the ink jet process or similar processes should have optical properties such as a hue, transparency, and tinting strength and durability including weather resistance, heat resistance, and solvent resistance. They should also be safe. Pigments are more durable than dyes and thus in many cases are advantageous coloring materials over dyes for use in compositions for the formation of color images.

Yellow is one of the primary colors (yellow, magenta, and cyan), and widely used yellow pigments include Color Index (hereinafter abbreviated to C.I.) Pigment Yellow (hereinafter also referred to as PY) 74, 128, and so forth. These yellow pigments have room for improvement because the yellow colors they produce lack weather resistance.

To solve this problem, researchers have proposed many compositions, in particular, inks, that can produce yellow images that satisfies all of the above listed requirements.

For example, JP-A-2010-260281 discloses two ink compositions. One contains a liquid dispersion based on Pigment Yellow 155 and further contains an alicyclic epoxy compound, another epoxy compound, an oxetane, a cationic polymerizable compound (named Illustrative Compound 1-H in the publication), a surfactant, a photoacid generator, and an anthracene derivative, and the other contains a liquid dispersion based on Pigment Yellow 213 and further contains an alicyclic epoxy compound, another epoxy compound, an oxetane, a cationic polymerizable compound (Illustrative Compound 1-G), a surfactant, a photoacid generator, and an anthracene derivative (Ink Nos. Y-6 and Y-7 in Table 2).

JP-A-2009-1691 discloses an oily ink composition for ink jet recording. This composition contains a liquid pigment dispersion based on (1) C.I. Pigment Yellow 213, (2) C.I. Pigment Yellow 213 and 110, or (3) C.I. Pigment Yellow 213 and 139 and further contains diethylene glycol diethyl ether, tetraethylene glycol dimethyl ether, γ-butyrolactone, and an acrylic resin as a binder (Examples 1 to 3 of the publication, paragraphs [0042] to [0045]).

JP-T-2011-500932 discloses a yellow curable ink. This ink contains 3% by weight of C.I. PY 150 as an yellow pigment, 60.35% by weight of 2-(vinyloxyethoxy)ethyl acrylate (VEEA), and 2.5% by weight of a polymerization initiator (paragraphs [0405] to [0409] of the publication).

JP-A-2009-57548 discloses a light-curable ink composition. This composition contains 74.8% by weight of VEEA, 10% by weight of a hyperbranched polymer, 8% by weight of a polymerization initiator, and 7.2% by weight of a dispersion containing Pigment Yellow 155 (Example 4 in Table 1 of the publication).

These are all disadvantageous. The ink compositions according to JP-A-2010-260281 are difficult to cure with long-wavelength (350 to 420 nm) light-emitting diodes (LEDs) in an ultraviolet curing process using the photoacid generator and thus lack curability and become seriously viscous during that process. Worse yet, these ink compositions have unsatisfactory storage stability in some cases. The oily ink composition for ink jet recording according to JP-A-2009-1691 requires heating after printing because of its oily nature. During the heating process, some ingredients are evaporated and form VOCs (volatile organic compounds), which are impurities inherent to oily inks (inks based on organic solvent), and the ink composition itself becomes seriously viscous. The yellow curable ink according to JP-T-2011-500932 has room for improvement in safety because the pigment C.I. PY 150 contains nickel, and records produced using this ink are of unsatisfactory wet weather resistance (waterproofness). The light-curable ink composition according to JP-A-2009-57548 has room for improvement in storage stability.

SUMMARY

An advantage of some aspects of the invention is that they provide a light-curable ink composition for ink jet recording that is safe and has excellent curability, storage stability, and weather resistance.

The present inventors found after extensive research that the above problems could be solved by a light-curable ink composition for ink jet recording (hereinafter also simply referred to as an ink composition) containing an appropriately structured vinyl-ether-containing (meth)acrylate, C.I. Pigment Yellow 155, and a photopolymerization initiator, and thereby completed aspects of the invention. The (meth)acrylate is contained in a polymerizable compound, and C.I. Pigment Yellow 155 is contained in a coloring material.

More specifically, some aspects of the invention can be described as follows.

1. A light-curable ink composition for ink jet recording containing a coloring material, a polymerizable compound, and a photopolymerization initiator. The coloring material contains at least C.I. Pigment Yellow 155, and the polymerizable compound contains at least a vinyl-ether-containing (meth)acrylate represented by general formula (I) below:

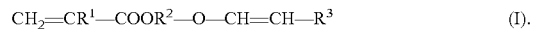

$$CH_2=CR^1-COOR^2-O-CH=CH-R^3 \quad (I).$$

(where $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms). The vinyl-ether-containing (meth)acrylate is present in an amount of 10 to 67% by mass relative to the total mass of the ink composition.

2. The light-curable ink composition for ink jet recording according to 1, wherein the polymerizable compound further contains a monofunctional (meth)acrylate other than the vinyl-ether-containing (meth)acrylate.

3. The light-curable ink composition for ink jet recording according to 2, wherein the monofunctional (meth)acrylate has at least either one of an aromatic skeleton and an alicyclic skeleton.

4. The light-curable ink composition for ink jet recording according to 2 or 3, wherein the monofunctional (meth)acrylate has an aromatic skeleton.

5. The light-curable ink composition for ink jet recording according to any of 1 to 4, wherein the vinyl-ether-containing (meth)acrylate is present in an amount of 10 to 40% by mass relative to the total mass of the ink composition.

6. The light-curable ink composition for ink jet recording according to any of 2 to 5, wherein the monofunctional (meth)acrylate is present in an amount of 10 to 60% by mass relative to the total mass of the ink composition.

7. The light-curable ink composition for ink jet recording according to any of 2 to 6, wherein the monofunctional (meth) acrylate is at least either one of phenoxy ethyl(meth)acrylate and benzyl(meth)acrylate.

8. The light-curable ink composition for ink jet recording according to any of 1 to 7, wherein C.I. Pigment Yellow 155 is present in an amount of 0.1 to 3% by mass relative to the total mass of the ink composition.

9. The light-curable ink composition for ink jet recording according to any of 1 to 8, wherein the photopolymerization initiator contains at least an acylphosphine oxide.

10. An ink jet recording method including ejecting the light-curable ink composition for ink jet recording according to any of 1 to 9 onto a recording medium and curing the ejected light-curable ink composition for ink jet recording by irradiation with ultraviolet radiation having an emission peak at a wavelength in the range of 350 to 420 nm.

11. The ink jet recording method according to 10, wherein the ultraviolet radiation used to cure the light-curable ink composition for ink jet recording has an energy of radiation equal to or lower than 600 mJ/cm$^2$.

12. The ink jet recording method according to 10 or 11, wherein the ultraviolet radiation used to cure the light-curable ink composition for ink jet recording has a peak radiation intensity equal to or higher than 800 mW/cm$^2$.

DESCRIPTION OF EXEMPLARY EMBODIMENTS

The following details some embodiments of the invention. These embodiments do not limit any aspect of the invention; various modifications can be made without departing from the spirit of each aspect of the invention.

As used herein, the term curing refers to operations including exposing an ink composition containing a polymerizable compound to radiation to polymerize the polymerizable compound and thereby hardening the ink composition, and curable means that the material is cured in response to light.

Storage stability represents the condition of an ink composition that is unlikely to change its viscosity during a 1-week storage period at 60° C. Weather resistance refers to the property of an image that keeps a good condition, or is unlikely to fade or discolor, when a print of the image is displayed outdoors, and ejection stability the capability of an ink jet apparatus to eject droplets of an ink composition from its nozzles always in a stable manner and with no clogging.

A (meth)acrylate represents an acrylate and/or the corresponding methacrylate, and (meth)acrylic an acryloyl group and/or the corresponding methacryloyl group.

A record is a piece of recording medium retaining a cured product of ink formed thereon, and a cured product includes all cured forms of ink such as cured film and coating.

Light-Curable Ink Composition for Ink Jet Recording

The light-curable ink composition for ink jet recording according to an embodiment of the invention contains at least a polymerizable compound, a coloring material, and a photopolymerization initiator. The polymerizable compound contains at least a vinyl-ether-containing (meth)acrylate represented by general formula (I) below:

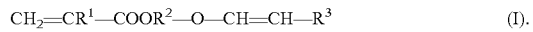

$$CH_2=CR^1-COOR^2-O-CH=CH-R^3 \qquad (I).$$

(where $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms).

The coloring material contains at least C.I. Pigment Yellow 155.

The following describes the essential ingredients of the ink composition according to this embodiment and additives that may be contained in the ink composition.

Coloring Material

The ink composition according to this embodiment contains at least C.I. Pigment Yellow 155 as a coloring material.

C.I. Pigment Yellow 155 is a condensed azo pigment with the chemical name 2,2'-[1,4-phenylene-bis[imino(1-acetyl-2-oxoethane-2,1-diyl)azo]]bis(dimethyl terephthalate) and its molecular formula is $C_{34}H_{32}N_6O_{12}$. As can be seen from this, C.I. Pigment Yellow 155 contains no nickel and thus is of great safety. The ink composition, containing C.I. Pigment Yellow 155, is therefore not only highly resistant to weather but also safe.

The content of C.I. Pigment Yellow 155 is preferably in the range of 0.1 to 6% by mass, more preferably 0.1 to 3% by mass, relative to the total mass of the ink composition (100% by mass). The effect of adding C.I. Pigment Yellow 155 is appreciable when the content of the pigment is equal to or higher than 0.1% by mass. The storage stability of the ink composition becomes higher as the content of the pigment is decreased to or below 6% by mass, and it becomes even higher the content of the pigment is decreased to or below 3% by mass.

The ink composition may contain one or more additional coloring materials. Suitable coloring materials include both pigments and dyes.

Pigments

The ink composition according to this embodiment can be more resistant to weather by containing one or more additional pigments. Examples of yellow pigments (excluding C.I. PY 155) suitable for this purpose include, but are not limited to, C.I. Pigment Yellow (PY) 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, 180, and 213.

One or a combination of two or more of these yellow pigments can be used.

Dyes

The ink composition according to this embodiment may also contain one or more dyes as additional coloring materials. Examples of suitable yellow dyes include, but are not limited to, C.I. Acid Yellow 17, 23, 42, 44, 79, and 142 and C.I. Direct Yellow 1, 12, 24, 33, 50, 55, 58, 86, 132, 142, 144, and 173.

One or a combination of two or more of these yellow dyes can be used.

When such an additional coloring material or materials are used, the total coloring material content is preferably in the range of 1 to 6% by mass, more preferably 1 to 3% by mass, relative to the total mass of the ink composition (100% by mass). The coloring materials give the ink composition a sufficiently strong color when their total content is equal to or higher than the lower limit specified above. Reducing the total coloring material content to or below the upper limit specified above is effective to prevent coatings formed using the ink composition from being difficult to cure because of the light-absorbing effect of the coloring materials themselves.

Dispersant

The ink composition according to this embodiment may contain one or more dispersants for better pigment dispersion. All kinds of dispersants can be used, including polymeric dispersants and other kinds of dispersants commonly used in liquid pigment dispersions. Specific examples include those mainly composed of one or more of the following substances: polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins. Examples of commercially available polymeric dispersants include AJISPER (trade name) line manufactured by Ajinomoto Fine-Techno Co., Inc., Solsperse line (e.g., Solsperse 32000 and 36000 [trade names]) available from Avecia Co., DISPERBYK (trade name) line manufactured by BYK Chemie, and DISPARLON line manufactured by Kusumoto Chemicals, Ltd.

One or a combination of two or more dispersants can be used. When a dispersant or dispersants are used, the content is not critical and can be appropriately selected.

Polymerizable Compound

The ink composition according to this embodiment contains one or more polymerizable compounds, and exposing the printed ink composition to ultraviolet radiation induces the polymerizable compound or compounds to be polymerized by the action of the photopolymerization initiator (or initiators), described later herein, and thereby to cure the ink composition.

Vinyl-Ether-Containing (Meth)Acrylate

The ink composition according to this embodiment contains at least a vinyl-ether-containing (meth)acrylate represented by general formula (I) above as a polymerizable compound.

The vinyl-ether-containing (meth)acrylate or (meth)acrylates give the ink composition excellent curability and satisfactory smoothness. In addition, single compounds having a vinyl ether group and a (meth)acrylic group in the molecule are more preferred than combinations of two separate compounds, vinyl-ether-containing one and (meth)acrylic one, in terms of the curability of the resulting ink composition.

Preferred examples of $R^2$ in general formula (I) above, a divalent organic residue having 2 to 20 carbon atoms (a $C_2$ to $C_{20}$ divalent organic residue), are linear, branched, or cyclic substituted or unsubstituted $C_2$ to $C_{20}$ alkylene groups, substituted or unsubstituted $C_2$ to $C_{20}$ alkylene groups having an oxygen atom derived from an internal ether or ester bond, and substituted or unsubstituted $C_6$ to $C_{11}$ divalent aromatic groups. Particularly preferred ones are $C_2$ to $C_6$ alkylene groups, such as ethylene, n-propylene, isopropylene, and butylene groups, and $C_2$ to $C_9$ alkylene groups having an oxygen atom derived from an internal ether bond, such as oxyethylene, oxy-n-propylene, oxyisopropylene, and oxybutylene groups.

Preferred examples of $R^3$ in general formula (I) above, which is a monovalent organic residue having 1 to 11 carbon atoms (a $C_1$ to $C_{11}$ monovalent organic residue) unless it is a hydrogen atom, are linear, branched, or cyclic substituted or unsubstituted $C_1$ to $C_{10}$ alkyl groups and substituted or unsubstituted $C_6$ to $C_{11}$ aromatic groups. Particularly preferred ones are methyl and ethyl groups ($C_1$ and $C_2$ alkyl groups) and $C_6$ to $C_8$ aromatic groups, such as phenyl and benzyl groups.

Possible substituents of these organic residues are divided into those having carbon atoms and those having no carbon atoms. When any substituent having carbon atoms is used, the carbon atoms of this substituent should be included in the number of the carbon atoms of the organic residue. Examples of suitable substituents having carbon atoms include, but are not limited to, carboxy and alkoxy groups. Examples of suitable substituents having no carbon atoms include, but are not limited to, hydroxy and halo groups.

Examples of appropriate vinyl-ether-containing (meth)acrylates include, but are not limited to, the following: 2-vinyloxyethyl(meth)acrylate, 3-vinyloxypropyl(meth)acrylate, 1-methyl-2-vinyloxyethyl(meth)acrylate, 2-vinyloxypropyl(meth)acrylate, 4-vinyloxybutyl(meth)acrylate, 1-methyl-3-vinyloxypropyl(meth)acrylate, 1-vinyloxymethyl propyl(meth)acrylate, 2-methyl-3-vinyloxypropyl(meth)acrylate, 1,1-dimethyl-2-vinyloxyethyl(meth)acrylate, 3-vinyloxybutyl(meth)acrylate, 1-methyl-2-vinyloxypropyl(meth)acrylate, 2-vinyloxybutyl(meth)acrylate, 4-vinyloxycyclohexyl(meth)acrylate, 6-vinyloxyhexyl(meth)acrylate, 4-vinyloxymethyl cyclohexyl methyl(meth)acrylate, 3-vinyloxymethyl cyclohexyl methyl(meth)acrylate, 2-vinyloxymethyl cyclohexyl methyl(meth)acrylate, p-vinyloxymethyl phenyl methyl(meth)acrylate, m-vinyloxymethyl phenyl methyl(meth)acrylate, o-vinyloxymethyl phenyl methyl(meth)acrylate, 2-(vinyloxyethoxy)ethyl(meth)acrylate, 2-(vinyloxyisopropoxy)ethyl(meth)acrylate, 2-(vinyloxyethoxy)propyl(meth)acrylate, 2-(vinyloxyethoxy)isopropyl(meth)acrylate, 2-(vinyloxyisopropoxy)propyl(meth)acrylate, 2-(vinyloxyisopropoxy)isopropyl(meth)acrylate, 2-(vinyloxyethoxyethoxy)ethyl(meth)acrylate, 2-(vinyloxyethoxyisopropoxy)ethyl(meth)acrylate, 2-(vinyloxyisopropoxyethoxy)ethyl(meth)acrylate, 2-(vinyloxyisopropoxyisopropoxy)ethyl(meth)acrylate, 2-(vinyloxyethoxyethoxy)propyl(meth)acrylate, 2-(vinyloxyethoxyisopropoxy)propyl(meth)acrylate, 2-(vinyloxyisopropoxyethoxy)propyl(meth)acrylate, 2-(vinyloxyisopropoxyisopropoxy)propyl(meth)acrylate, 2-(vinyloxyethoxyethoxy)isopropyl(meth)acrylate, 2-(vinyloxyethoxyisopropoxy)isopropyl(meth)acrylate, 2-(vinyloxyisopropoxyethoxy)isopropyl(meth)acrylate, 2-(vinyloxyisopropoxyisopropoxy)isopropyl(meth)acrylate, 2-(vinyloxyethoxyethoxyethoxy)ethyl(meth)acrylate, 2-(vinyloxyethoxyethoxyethoxyethoxy)ethyl(meth)acrylate, 2-(isopropenoxyethoxy)ethyl(meth)acrylate, 2-(isopropenoxyethoxyethoxy)ethyl(meth)acrylate, 2-(isopropenoxyethoxyethoxyethoxy)ethyl(meth)acrylate, 2-(isopropenoxyethoxyethoxyethoxyethoxy)ethyl(meth)acrylate, polyethylene glycol monovinyl ether(meth)acrylate, and polypropylene glycol monovinyl ether(meth)acrylate.

Among these, 2-(vinyloxyethoxy)ethyl(meth)acrylate, i.e., 2-(vinyloxyethoxy)ethyl acrylate or 2-(vinyloxyethoxy)ethyl methacrylate or a combination of them, is preferred because it has a high flash point and gives the ink composition lower viscosity and better curability than other (meth)acrylates, and using 2-(vinyloxyethoxy)ethyl acrylate alone is more preferred. Both 2-(vinyloxyethoxy)ethyl acrylate and 2-(vinyloxyethoxy)ethyl methacrylate have a simple structure and a small molecular weight and thus give outstanding smoothness to the ink composition. Examples of 2-(vinyloxyethoxy)ethyl(meth)acrylate include 2-(2-vinyloxyethoxy)ethyl(meth)acrylate and 2-(1-vinyloxyethoxy)ethyl(meth)acrylate, and examples of 2-(vinyloxyethoxy)ethyl acrylate include 2-(2-vinyloxyethoxy)ethyl acrylate and 2-(1-vinyloxyethoxy)ethyl acrylate. In addition, 2-(vinyloxyethoxy)ethyl acrylate is better than 2-(vinyloxyethoxy)ethyl methacrylate in terms of curability.

One or a combination of two or more vinyl-ether-containing (meth)acrylates can be used.

The content of the vinyl-ether-containing (meth)acrylate or (meth)acrylates is in the range of 10 to 67% by mass relative to the total mass of the ink composition (100% by mass). The vinyl-ether-containing (meth)acrylate or (meth)acrylates give the ink composition satisfactory smoothness and excellent curability at a content equal to or higher than 10% by mass, and ensure excellent storage stability of the ink composition at a content equal to or lower than 67% by mass. In order for the ink composition to have further reduced viscosity and more improved curability and storage stability, the vinyl-ether-containing (meth)acrylate content is preferably in the range of 10 to 65% by mass, more preferably 10 to 50% by mass, even more preferably 10 to 40% by mass, and particularly preferably 10 to 30% by mass. When great importance is attached to the smoothness and curability of the ink composition, the vinyl-ether-containing (meth)acrylate content is preferably in the range of 30 to 67% by mass, more preferably 40 to 67% by mass, and even more preferably 50 to 67% by mass.

Processes for preparing the vinyl-ether-containing (meth)acrylate or (meth)acrylates include, but are not limited to, the following: esterifying a (meth)acrylic acid and a hydroxy-containing vinyl ether (process B), esterifying a (meth)acrylic acid halide and a hydroxy-containing vinyl ether (process C), esterifying a (meth)acrylic acid anhydride and a hydroxy-containing vinyl ether (process D), transesterifying a (meth)acrylate and a hydroxy-containing vinyl ether (process E), esterifying a (meth)acrylic acid and a halogen-containing vinyl ether (process F), esterifying a (meth)acrylic acid-alkali (or alkaline-earth) metal salt and a halogen-containing vinyl ether (process G), transvinylating a hydroxy-containing (meth)acrylate and a vinyl carboxylate (process H), and transetherifying a hydroxy-containing (meth)acrylate and an alkyl vinyl ether (process I).

Process E is particularly preferred because by using this process the intended advantages of this embodiment can be enhanced.

Monofunctional (Meth)Acrylate

Preferably, the ink composition according to this embodiment contains one or more monofunctional (meth)acrylates (other than the vinyl-ether-containing (meth)acrylates defined by general formula (I); the same shall apply hereinafter) as an additional polymerizable compound or compounds. This further improves the storage stability of the ink composition and also ensures that the photopolymerization initiator (or initiators) is easily soluble.

Examples of monofunctional (meth)acrylates suitable for this purpose include, but are not limited to, the following: isoamyl(meth)acrylate, stearyl(meth)acrylate, lauryl(meth)acrylate, octyl(meth)acrylate, decyl(meth)acrylate, isomyristyl(meth)acrylate, isostearyl(meth)acrylate, 2-ethyl hexyl-diglycol(meth)acrylate, 2-hydroxybutyl(meth)acrylate, 4-hydroxybutyl(meth)acrylate, butoxyethyl(meth)acrylate, ethoxydiethylene glycol(meth)acrylate, methoxydiethylene glycol(meth)acrylate, methoxypolyethylene glycol(meth)acrylate, methoxypropylene glycol(meth)acrylate, phenoxyethyl(meth)acrylate, tetrahydrofurfuryl(meth)acrylate, isobornyl(meth)acrylate, 2-hydroxyethyl(meth)acrylate, 2-hydroxypropyl(meth)acrylate, 2-hydroxy-3-phenoxypropyl(meth)acrylate, lactone-modified flexible (meth)acrylate, t-butyl cyclohexyl(meth)acrylate, dicyclopentanyl(meth)acrylate, dicyclopentenyloxyethyl(meth)acrylate, and benzyl(meth)acrylate.

The use of phenoxyethyl(meth)acrylate and/or benzyl(meth)acrylate is preferred, and the use of phenoxyethyl acrylate and/or benzyl acrylate is more preferred. These compounds are particularly helpful in reducing the viscosity of the ink composition and also have outstanding curability.

It is further preferred that the monofunctional (meth)acrylate or (meth)acrylates have an aromatic skeleton and/or an alicyclic skeleton, more preferably an aromatic skeleton. This allows the photopolymerization initiator (or initiators) to be more easily dissolved. Alicyclic skeletons can be divided into saturated ones and unsaturated ones.

Examples of monofunctional (meth)acrylates having an aromatic skeleton include phenoxyethyl(meth)acrylate, benzyl(meth)acrylate, and 2-hydroxy-3-phenoxypropyl(meth)acrylate. Phenoxyethyl(meth)acrylate and benzyl(meth)acrylate are preferred, phenoxyethyl acrylate is more preferred, and a combination of phenoxyethyl acrylate and benzyl acrylate is even more preferred.

Examples of monofunctional (meth)acrylates having a saturated alicyclic skeleton include isobornyl(meth)acrylate, t-butyl cyclohexyl(meth)acrylate, and dicyclopentanyl(meth)acrylate. Isobornyl(meth)acrylate is preferred, and isobornyl acrylate is more preferred.

Examples of monofunctional (meth)acrylates having an unsaturated alicyclic skeleton include dicyclopentenyloxyethyl(meth)acrylate. When these three types of monofunctional (meth)acrylates are compared, those having an aromatic skeleton are particularly preferred in terms of curability, the dissolution of the initiator (or initiators), and other factors.

One or a combination of two or more monofunctional (meth)acrylates can be used.

When a monofunctional (meth)acrylate or (meth)acrylates are used, the content is preferably in the range of 10 to 60% by mass, more preferably 10 to 50% by mass, and even more preferably 15 to 40% by mass, relative to the total mass of the ink composition (100% by mass). When one or more monofunctional (meth)acrylates having an aromatic skeleton are contained in the monofunctional (meth)acrylate component, the content of the aromatic compound(s) is preferably equal to or higher than 5% by mass, more preferably equal to or higher than 10% by mass, even more preferably equal to or higher than 15% by mass, and even much more preferably in the range of 15 to 40% by mass, relative to the total mass of the ink composition (100% by mass). The monofunctional (meth)acrylate or (meth)acrylates, when present at a content in the range specified above, are especially helpful in reducing the viscosity of the ink composition, dissolving the photopolymerization initiator (or initiators), and ensuring the good curability of the ink composition.

Polyfunctional (Meth)Acrylate

The ink composition according to this embodiment may contain one or more polyfunctional (meth)acrylates as an additional polymerizable compound or compounds.

Suitable polyfunctional (meth)acrylates can be divided into those having two functional groups (excluding the vinyl-ether-containing (meth)acrylates defined above) and those having three or more functional groups. Examples of suitable bifunctional (meth)acrylates include, but are not limited to, the following: triethyleneglycol di(meth)acrylate, tetraethyleneglycol di(meth)acrylate, polyethyleneglycol di(meth)acrylate, dipropyleneglycol di(meth)acrylate, tripropyleneglycol di(meth)acrylate, polypropyleneglycol di(meth)acrylate, 1,4-butanediol di(meth)acrylate, 1,6-hexanediol di(meth)acrylate, 1,9-nonanediol di(meth)acrylate, neopentylglycol di(meth)acrylate, dimethylol-tricyclodecane di(meth)acrylate, EO (ethylene oxide) adducts of bisphenol A di(meth)acrylate, PO (propylene oxide) adducts of bisphenol A di(meth)acrylate, hydroxypivalic acid neopentylglycol di(meth)acrylate, and polytetramethyleneglycol di(meth)acrylate. The use of dipropyleneglycol acrylate and/or tripropyleneglycol diacrylate is preferred, as these compounds are particularly helpful in reducing the viscosity of the ink composition while ensuring excellent curability.

Examples of suitable polyfunctional (meth)acrylate having three or more functional groups include, but not limited to, the following: trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerol propoxy tri(meth) acrylate, caprolactone-modified trimethylolpropane tri (meth)acrylate, pentaerythritol ethoxy tetra(meth)acrylate, and caprolactam-modified dipentaerythritol hexa(meth)acrylate.

One or a combination of two or more polyfunctional (meth) acrylates can be used.

When a polyfunctional (meth)acrylate or (meth)acrylates are used, their content is preferably in the range of 2 to 30% by mass, more preferably 5 to 20% by mass. This is especially effective to make the ink composition smoother and more curable.

Other Polymerizable Compounds

A wide range of polymerizable compounds can be used in this embodiment in addition to the vinyl-ether-containing (meth)acrylates, monofunctional (meth)acrylates, and polyfunctional (meth)acrylates described above, including various known monofunctional or polyfunctional monomers and oligomers (hereinafter referred to as miscellaneous polymerizable compounds). Examples of suitable monomers include the following: unsaturated carboxylic acids, such as itaconic acid, crotonic acid, isocrotonic acid, and maleic acid, and their salts; esters, urethanes, amides and anhydrides; acrylonitrile; styrene; unsaturated polyesters, unsaturated polyethers, unsaturated polyamides, and unsaturated urethanes. Examples of suitable oligomers include ones derived from the monomers listed above.

One or a combination of two or more miscellaneous polymerizable compounds can be used. When such a polymerizable compound or compounds are used, the content is usually equal to or lower than 20% by mass relative to the total mass of the ink composition (100% by mass).

Photopolymerization Initiator

The ink composition according to this embodiment contains one or more photopolymerization initiators. When the ink composition is applied to a recording medium and irradiated with ultraviolet radiation, the photopolymerization initiator or initiators induce photopolymerization, through which the ink composition is cured to print letters, an image, or the like. Among other kinds of radiation, ultraviolet radiation (UV) is chosen as it is of great safety and is affordable in terms of the cost of light sources. All kinds of photopolymerization initiators can be used as long as they can generate radicals, cations, or any other kind of active species using optical (ultraviolet) energy and thereby can initiate the polymerization of the polymerizable compound or compounds. For example, radical or cationic photopolymerization initiators can be used, and radical photopolymerization initiators are preferred.

Examples of suitable radical photopolymerization initiators include aromatic ketones, acylphosphine oxides, aromatic onium salts, organic peroxides, thio compounds (e.g., thioxanthones and thiophenyl-containing compounds), hexaarylbiimidazoles, ketoxime esters, borates, azinium compounds, metallocenes, active esters, compounds having carbon-halogen bonds, and alkylamines.

The use of at least an acylphosphine oxide is preferred, as this further enhances the curability of the ink composition. It is also preferred to use a thioxanthone in combination with an acylphosphine oxide.

Specific examples of suitable radical photopolymerization initiators include acetophenone, acetophenone benzyl ketal, 1-hydroxycyclohexyl phenyl ketone, 2,2-dimethoxy-2-phenyl acetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio) phenyl]-2-morpholinopropan-1-one, bis(2,4,6-trimethylbenzoyl)phenylphosphine oxide, 2,4,6-trimethylbenzoyldiphenylphosphine oxide, 2,4-diethylthioxanthone, and bis(2,6-dimethoxybenzoyl)-2,4,4-trimethylpentylphosphine oxide.

Examples of commercially available radical photopolymerization initiators include the following: IRGACURE 651 (2,2-dimethoxy-1,2-diphenylethan-1-one), IRGACURE 184 (1-hydroxycyclohexyl phenyl ketone), DAROCUR 1173 (2-hydroxy-2-methyl-1-phenylpropan-1-one), IRGACURE 2959 (1-[4-(2-hydroxyethoxy)phenyl]-2-hydroxy-2-methyl-1-propan-1-one), IRGACURE 127 (2-hydroxy-1-{4-[4-(2-hydroxy-2-methylpropionyl)benzyl]phenyl}-2-methylpropan-1-one), IRGACURE 907 (2-methyl-1-(4-methylthiophenyl)-2-morpholinopropan-1-one), IRGACURE 369 (2-benzyl-2-dimethylamino-1-(4-morpholinophenyl)-1-butanone), IRGACURE 379 (2-(dimethylamino)-2-[(4-methylphenyl)methyl]-1-[4-(4-morpholinyl) phenyl]-1-butanone), DAROCUR TPO (2,4,6-trimethylbenzoyldiphenylphosphine oxide), IRGACURE 819 (bis(2,4,6-trimethylbenzoyl)phenylphosphine oxide), IRGACURE 784 (bis(η5-2,4-cyclopentadien-1-yl)-bis[2,6-difluoro-3-(1H-pyrrole-1-yl)phenyl]titanium), IRGACURE OXE 01 (1-[4-(phenylthio)phenyl]-1,2-octandione 2-(O-benzoyloxime)), IRGACURE OXE 02 (1-[9-ethyl-6-(2-methylbenzoyl)-9H-carbazole-3-yl]ethanone 1-(O-acetyloxime)), IRGACURE 754 (a mixture of 2-(2-oxo-2-phenylacetoxyethoxy)ethyl oxyphenylacetate and 2-(2-hydroxyethoxy)ethyl oxyphenylacetate) (all these manufactured by BASF), KAYACURE DETX-S (2,4-diethylthioxanthone, Nippon Kayaku Co., Ltd.), Lucirin TPO, LR8893, and LR8970 (all these manufactured by BASF), and Ubecryl P36 (UCB).

One or a combination of two or more photopolymerization initiators can be used.

The photopolymerization initiator content is preferably in the range of 3 to 20% by mass relative to the total mass of the ink composition (100% by mass). This allows the ink composition to be cured faster upon exposure to ultraviolet radiation and thereby gives the ink composition excellent curability, and also prevents the photopolymerization initiator or initiators from remaining incompletely dissolved and discoloring the ink composition.

Slipping Agent

The ink composition according to this embodiment may contain one or more slipping agents (surfactants). All kinds of slipping agents can be used, including silicone surfactants such as polyester- or polyether-modified silicones. The use of a polyester- or polyether-modified polydimethylsiloxane is particularly preferred. Specific examples include BYK-347, BYK-348, BYK-UV3500, BYK-UV3510, BYK-UV3530, and BYK-UV3570 (all these manufactured by BYK).

One or a combination of two or more slipping agents can be used. When a slipping agent or agents are used, the content is not critical and can be appropriately selected.

Polymerization Inhibitor

The ink composition according to this embodiment may contain one or more polymerization inhibitors. Polymerization inhibitors, when present in the ink composition, prevent the polymerizable compound or compounds from being polymerized before the intended curing process.

Although all kinds of polymerization inhibitors can be used, typical examples are phenolic inhibitors. Suitable phenolic inhibitors include, but are not limited to, p-methoxyphenol, cresol, t-butylcatechol, di-t-butylparacresol, hydroquinone monomethyl ether, α-naphthol, 3,5-di-t-butyl-4-hydroxytoluene, 2,6-di-t-butyl-4-methylphenol, 2,2'-methylene bis(4-methyl-6-t-butylphenol), 2,2'-methylene bis(4-ethyl-6-butylphenol), and 4,4'-thiobis(3-methyl-6-t-butylphenol).

Examples of commercially available phenolic inhibitors include p-Methoxyphenol (a trade name of Tokyo Chemical Industry Co., Ltd., p-methoxyphenol), NONFLEX MBP (a trade name Seiko Chemical Co., Ltd., 2,2'-methylene bis(4-methyl-6-t-butylphenol)), and BHT SWANOX (a trade name of Seiko Chemical Co., Ltd., 2,6-di-t-butyl-4-methylphenol).

One or a combination of two or more polymerization inhibitors can be used. When a polymerization inhibitor or inhibitors are used, the content is not critical and can be appropriately selected.

Other Additives

The ink composition according to this embodiment may contain additives (ingredients) other than those mentioned above. The kinds of the additives are not particularly limited; additives such as known polymerization accelerators, penetration enhancers, and moisturizing agents (humectants) may be used. Additives other than these may also be used, including known fixatives, antimolds, preservatives, antioxidants, ultraviolet-absorbing agents, chelators, pH-adjusting agents, and thickeners.

Characteristics of the Light-Curable Ink Composition for Ink Jet Recording

The above-described ink composition is cured upon exposure to ultraviolet radiation, preferably ultraviolet radiation with an emission peak at a wavelength in the range of 350 to 420 nm. Because of its composition, the ink composition according to this embodiment can be cured rapidly and requiring low energy when it is curable with radiation having an emission peak at a wavelength in the above range. The low energy requirement for curing is particularly advantageous because it allows for the use of light-emitting diodes (LEDs), which have recently been a focus of attention in the environmental and other contexts, as ultraviolet radiation sources. In other words, the ink composition according to this embodiment is excellently curable with LEDs.

Furthermore, the energy of radiation of the ultraviolet radiation used to cure the ink composition is preferably equal to or lower than 600 mJ/cm$^2$, more preferably equal to or lower than 500 mJ/cm$^2$, and even more preferably equal to or lower than 200 mJ/cm$^2$, and it is preferably equal to or higher than 50 mJ/cm$^2$ and more preferably equal to or higher than 100 mJ/cm$^2$. Constituted in such a way, this ink composition allows for image formation at low cost. The energy of radiation is the product of the duration of exposure and the radiation intensity.

As can be seen from the foregoing, this embodiment provides a light-curable ink composition for ink jet recording that is safe because of its nickel-free formula and that is excellent in all of curability, storage stability and weather resistance as well as smoothness and the dissolution of the photopolymerization initiator or initiators contained therein.

Recording Medium

The ink composition according to this embodiment produces a record by, for example, being ejected onto a recording medium by the ink jet recording method described later herein. Examples of suitable recording media include absorbent ones and nonabsorbent ones. The ink jet recording method described as another embodiment later herein can be applied to a wide variety of recording media with different absorption properties, ranging from nonabsorbent ones, which are not easily penetrable with aqueous ink, to absorbent ones, which are easily penetrable with aqueous ink. However, using the above-described ink composition with a nonabsorbent recording medium may require drying or other similar treatment after ultraviolet curing.

For absorbent recording media, all kinds of them can be used. Examples include paper highly penetrable with aqueous ink, such as electrophotographic paper and other kinds of plain paper and ink jet printing paper (paper exclusively used for ink jet printing, which has an ink-absorbing layer based on particulate silica or alumina or polyvinyl alcohol (PVA), polyvinyl pyrrolidone (PVP), or a similar hydrophilic polymer) and paper relatively impenetrable with aqueous ink, such as art paper, coated paper, cast-coated paper, and other kinds of paper for ordinary offset printing.

For nonabsorbent recording media, likewise, all kinds of them can be used. Examples include films, sheets, and plates of plastics such as polyvinyl chloride (PVC), polyethylene, polypropylene, and polyethylene terephthalate (PET), plates of metals such as iron, silver, copper, and aluminum, metal plates or plastic films coated with such metals by deposition, and plates of alloys such as stainless steel and brass.

Ink Jet Recording Method

Another embodiment of the invention relates to an ink jet recording method. The light-curable ink composition for ink jet recording according to the above embodiment can be suitably used in the ink jet recording method according to this embodiment. This ink jet recording method includes ejecting the ink composition onto a recording medium and curing the ejected ink composition by irradiation with ultraviolet radiation having an emission peak at a wavelength in the range of 350 to 420 nm. The ink composition cured on the recording medium in this way forms an image, or in other words an ink coating (a cured film). Yet another embodiment of the invention relates to the light-curable ink composition for ink jet recording according to the above embodiment used in the ink jet recording method according to this embodiment. The phrase the light-curable ink composition for ink jet recording according to the above embodiment used in the ink jet recording method according to this embodiment refers to the light-curable ink composition for ink jet recording according to the above embodiment sold for use with a recording apparatus for producing records by the ink jet recording method according to this embodiment.

Ejection

The ink composition is ejected onto a recording medium so that the ink composition should adhere to the recording medium. The viscosity of the ink composition at ejection is preferably lower than 30 mPa·s, more preferably equal to or lower than 25 mPa·s, and even more preferably in the range of 5 to 20 mPa·s. When the viscosity of the ink composition is as above at room temperature or with no heat applied to the ink composition, the ink composition can be ejected after being adjusted to room temperature or with no heat applied thereto. In such cases, the temperature of the ink composition at ejection is preferably in the range of 20 to 30° C. If necessary, the ink composition may be heated to have a preferred viscosity before ejection. This ensures good ejection stability.

The light-curable ink composition according to the above embodiment is more viscous than ordinary aqueous ink compositions, and thus its viscosity at ejection greatly varies depending on its temperature at that time. Such variations in ink viscosity affect the size and ejection speed of ink droplets and can result in reduced image quality. It is therefore preferred that the temperature of the ink composition at ejection is kept as constant as possible.

Curing

The ink composition ejected onto and adhering to the recording medium is then cured by exposure to light (ultraviolet radiation). The mechanism of this process is the following: the photopolymerization initiator(s) contained in the ink composition is degraded upon exposure to ultraviolet radiation and generates an initiating species such as a radical, an acid, or a base, and this initiating species works to promote the polymerization reaction of the polymerizable compound(s). In other words, irradiation with ultraviolet radiation brings the polymerizable compound(s) into polymerization reaction. In this process, if the ink composition contains a sensitizing dye in addition to the photopolymerization initiator(s), the molecules of the sensitizing dye in the system absorb the ultraviolet radiation and thereby get into an excited state, and the excited molecules come into contact with the molecules of the photopolymerization initiator(s) and promote the degradation of the photopolymerization initiator(s), allowing the system to complete curing reaction with improved sensitivity.

Mainstream ultraviolet radiation sources are mercury lamps, gas lasers, solid lasers, and so forth, and the curing of light-curable ink compositions for ink jet recording is usually performed using a mercury lamp or a metal halide lamp. Considering the current trend toward environmental protection, however, mercury-free light sources are highly recommended; for example, GaN semiconductor ultraviolet light-emitting devices are of great value both industrially and environmentally. Ultraviolet light-emitting diodes (UV-LEDs) and ultraviolet laser diodes (UV-LDs), both of which are small-sized, long-life, high-efficiency, low-cost light sources, are also promising for use as light sources in ink jet recording with light-curable ink compositions. Among these, UV-LEDs are preferred.

In a preferred curing process in this ink jet recording method, a UV-LED light, preferably one with an emission peak at a wavelength in the range of 350 to 420 nm because the power can be easily increased, is used to cure the ink composition for ink jet recording using ultraviolet radiation, preferably with an energy of radiation equal to or lower than 600 mJ/cm$^2$, more preferably equal to or lower than 500 mJ/cm$^2$, and even more preferably equal to or lower than 200 mJ/cm$^2$. This can reduce the printing cost and increase the printing speed. The ink composition can provide these benefits when it contains a photopolymerization initiator that is degraded upon exposure to ultraviolet radiation having a wavelength in the above range and/or a polymerizable compound that starts to be polymerized upon exposure to ultraviolet radiation having a wavelength in the above range.

When an LED light is used, its peak radiation intensity is preferably equal to or higher than 800 mW/cm$^2$ and more preferably in the range of 800 to 2000 mW/cm$^2$. An LED light with a peak radiation intensity equal to or higher than 800 mW/cm$^2$ is particularly effective to cure the ink composition and gives the prints a beautiful finish.

As can be seen from the foregoing, this embodiment provides an ink jet recording method using a light-curable ink composition for ink jet recording that is smooth, safe because of its nickel-free formula, and excellent in all of curability, storage stability, weather resistance, and the dissolution of the photopolymerization initiator or initiators contained therein.

EXAMPLES

The following further details an embodiment of the invention with reference to examples. These examples should not be construed as limiting that embodiment.

Ingredients

In the examples and comparative examples below, the following ingredients were used.

Pigments

Novoperm Yellow 4G01 (a trade name of Clariant, C.I. Pigment Yellow 155, hereinafter abbreviated to PY-155)

Yellow HG-AF LP901 (a trade name of Clariant, C.I. Pigment Yellow 180, hereinafter abbreviated to PY-180)

Dispersant

Solsperse 32000 (a trade name of LUBRIZOL, hereinafter abbreviated to SOL 32000) Vinyl-ether-containing (meth)acrylate VEEA (2-(2-vinyloxyethoxy)ethyl acrylate, a trade name of Nippon Shokubai Co., Ltd.)

In the tables below, "Acryl-vinyl monomer" refers to this vinyl-ether-containing (meth)acrylate.

Monofunctional (Meth)Acrylates

Viscoat #192 (phenoxyethyl acrylate, a trade name of OSAKA ORGANIC CHEMICAL INDUSTRY LTD., hereinafter abbreviated to PEA)

FA-BZA (benzyl acrylate, a trade name of Hitachi Chemical Co., Ltd., hereinafter abbreviated to BZA)

IBXA (isobornyl acrylate, a trade name of OSAKA ORGANIC CHEMICAL INDUSTRY LTD.)

Polyfunctional (Meth)Acrylates

NK Ester APG-100 (a trade name of SHIN-NAKAMURA CHEMICAL CO., LTD., dipropyleneglycol diacrylate, hereinafter abbreviated to DPGDA)

NK Ester APG-200 (a trade name of SHIN-NAKAMURA CHEMICAL CO., LTD., tripropyleneglycol diacrylate, hereinafter abbreviated to TPGDA)

Polymerization Inhibitor p-Methoxyphenol (a trade name of Tokyo Chemical Industry Co., Ltd., p-methoxyphenol, hereinafter abbreviated to MEHQ)

Slipping Agent

BYK-UV3500 (a trade name of BYK, a silicone surface conditioner, hereinafter abbreviated to UV-3500)

Photopolymerization Initiators (Radical)

IRGACURE 819 (a trade name of BASF, 100% solids, hereinafter abbreviated to 819)

DAROCUR TPO (a trade name of BASF, 100% solids, hereinafter abbreviated to TPO)

KAYACURE DETX-S (a trade name of Nippon Kayaku Co., Ltd., 100% solids, hereinafter abbreviated to DETX)

Examples 1 to 15 and Comparative Examples 1 to 4

First, liquid pigment dispersions (hereinafter also simply referred to as dispersions) were prepared. More specifically, the ingredients listed in the rows "Pigment," "Dispersant," and "Monomer for pigment dispersion" in Tables 1 and 2 were blended in accordance with the proportions (unit of measurement: % by mass) specified in Tables 1 and 2 to form dispersions.

The obtained dispersions were each stirred in a high-speed water-cooling stirring machine. In this way, light-curable yellow ink compositions for ink jet recording were prepared.

TABLE 1

| Ingredient | Abbreviation | Example 1 | Example 2 | Example 3 | Example 4 | Example 5 | Example 6 | Example 7 | Example 8 | Example 9 |
|---|---|---|---|---|---|---|---|---|---|---|
| Pigment | PY-155 | 3.0 | 3.0 | 3.0 | 3.0 | 3.0 | 3.0 | 3.0 | 3.0 | 3.0 |
|  | PY-180 | — | — | — | — | — | — | — | — | — |
| Dispersant | SOL32000 | 1.5 | 1.5 | 1.5 | 1.5 | 1.5 | 1.5 | 1.5 | 1.5 | 1.5 |
| Monomer for pigment dispersion | PEA | 15.5 | 15.5 | 15.5 | 15.5 | 10.5 | 15.5 | 15.5 | 15.5 | 15.5 |
|  | IBXA | — | — | — | — | — | — | — | — | — |
|  | DPGDA | — | — | — | — | — | — | — | — | — |
| Acryl-vinyl monomer | VEEA | 20.0 | 10.0 | 30.0 | 40.0 | 65.0 | 20.0 | 20.0 | 20.0 | 20.0 |
| Monofunctional monomer | PEA | 14.5 | 11.5 | 20.5 | 15.5 | 0.5 | 0.5 | 40.5 | 7.0 | 14.5 |
|  | BZA | — | — | — | — | — | — | — | 7.5 | — |
| Polyfunctional monomer | DPGDA | 31.3 | 44.3 | 15.3 | 10.3 | 5.3 | 40.3 | 5.3 | 31.3 | 20.0 |
|  | TPGDA | — | — | — | — | — | 5.0 | — | — | 11.3 |
| Polymerization inhibitor | MEHQ | 0.2 | 0.2 | 0.2 | 0.2 | 0.2 | 0.2 | 0.2 | 0.2 | 0.2 |
| Slipping agent | UV-3500 | 0.2 | 0.2 | 0.2 | 0.2 | 0.2 | 0.2 | 0.2 | 0.2 | 0.2 |
| Photopolymerization initiators | 819 | 6.0 | 6.0 | 6.0 | 6.0 | 6.0 | 6.0 | 6.0 | 6.0 | 6.0 |
|  | TPO | 4.8 | 4.8 | 4.8 | 4.8 | 4.8 | 4.8 | 4.8 | 4.8 | 4.8 |
|  | DETX | 3.0 | 3.0 | 3.0 | 3.0 | 3.0 | 3.0 | 3.0 | 3.0 | 3.0 |
| Total |  | 100.0 | 100.0 | 100.0 | 100.0 | 100.0 | 100.0 | 100.0 | 100.0 | 100.0 |
| VEEA content |  | 20.0 | 10.0 | 30.0 | 40.0 | 65.0 | 20.0 | 20.0 | 20.0 | 20.0 |
| Monofunctional acrylate content |  | 30.0 | 27.0 | 36.0 | 31.0 | 11.0 | 16.0 | 56.0 | 30.0 | 30.0 |

TABLE 2

| Ingredient | Abbreviation | Example 10 | Example 11 | Example 12 | Example 13 | Example 14 | Example 15 | Comparative Example 1 | Comparative Example 2 | Comparative Example 3 | Comparative Example 4 |
|---|---|---|---|---|---|---|---|---|---|---|---|
| Pigment | PY-155 | 3.0 | 3.0 | 3.0 | 6.0 | 3.0 | 3.0 | 3.0 | 3.0 | 3.0 | — |
|  | PY-180 | — | — | — | — | — | — | — | — | — | 3.0 |
| Dispersant | SOL32000 | 1.5 | 1.5 | 1.5 | 1.5 | 1.5 | 1.5 | 1.5 | 1.5 | 1.5 | 1.5 |
| Monomer for pigment dispersion | PEA | — | 10.5 | 15.5 | 15.5 | — | 10.5 | 15.5 | 15.5 | 10.5 | 10.5 |
|  | IBXA | 10.5 | — | — | — | — | — | — | — | — | — |
|  | DPGDA | — | — | — | — | 15.5 | 3.8 | — | — | — | — |
| Acryl-vinyl monomer | VEEA | 20.0 | 20.0 | 10.0 | 20.0 | 20.0 | 67.0 | — | 5.0 | 70.0 | 70.0 |
| Monofunctional monomer | PEA | 3.0 | 3.0 | 46.8 | 14.5 | — | — | 30.0 | 25.0 | 0.8 | 0.8 |
|  | BZA | — | — | — | — | — | — | — | — | — | — |
| Polyfunctional monomer | DPGDA | 33.8 | 33.8 | 9.0 | 28.3 | 29.8 | — | 20.0 | 20.0 | — | — |
|  | TPGDA | 14.0 | 14.0 | — | — | 16.0 | — | 15.8 | 15.8 | — | — |
| Polymerization inhibitor | MEHQ | 0.2 | 0.2 | 0.2 | 0.2 | 0.2 | 0.2 | 0.2 | 0.2 | 0.2 | 0.2 |
| Slipping agent | UV-3500 | 0.2 | 0.2 | 0.2 | 0.2 | 0.2 | 0.2 | 0.2 | 0.2 | 0.2 | 0.2 |
| Photopolymerization initiators | 819 | 6.0 | 6.0 | 6.0 | 6.0 | 6.0 | 6.0 | 6.0 | 6.0 | 6.0 | 6.0 |
|  | TPO | 4.8 | 4.8 | 4.8 | 4.8 | 4.8 | 4.8 | 4.8 | 4.8 | 4.8 | 4.8 |
|  | DETX | 3.0 | 3.0 | 3.0 | 3.0 | 3.0 | 3.0 | 3.0 | 3.0 | 3.0 | 3.0 |
| Total |  | 100.0 | 100.0 | 100.0 | 100.0 | 100.0 | 100.0 | 100.0 | 100.0 | 100.0 | 100.0 |
| VEEA content |  | 20.0 | 20.0 | 10.0 | 20.0 | 20.0 | 67.0 | 0.0 | 5.0 | 70.0 | 70.0 |
| Monofunctional acrylate content |  | 13.5 | 13.5 | 62.3 | 30.0 | 0.0 | 10.5 | 45.5 | 40.5 | 11.3 | 11.3 |

Evaluation Items

The light-curable ink compositions for ink jet recording prepared in the examples and comparative examples were evaluated for viscosity, curability, storage stability, dissolution of photopolymerization initiators, and weather resistance in the following way.

1. Viscosity

The viscosity of each of the ink compositions of the examples and comparative examples was measured using DVM-E rotary viscometer (TOKYO KEIKI INC.) at a temperature of 25° C. and with a rotation velocity of 10 rpm. The evaluation criteria were as follows. Evaluation results are summarized in Tables 3 and 4.

A: ≤25 mPa·s
B: >25 mPa·s to <30 mPa·s
C: ≥30 mPa·s

2. Storage Stability

After the viscosity measurement described in 1. Viscosity, each of the ink compositions of the examples and comparative examples was put into an ink pack, and the ink packs were stored in an incubator at 60° C. for 7 days. The ink compositions were then allowed to cool to room temperature (25° C.), and the viscosity of each was measured in the same way as in 1. Viscosity. The storage stability was assessed on the basis of the percentage increase in viscosity during the storage period (the increase in the viscosity of the ink composition from before storage to after storage).

The evaluation criteria were as follows. Evaluation results are summarized in Tables 3 and 4.

A: <5%
B: ≥5% to <15%
C: ≥15% to <20%
D: ≥20%

3. Dissolution of Photopolymerization Initiators

Pigment-free ink compositions were prepared in accordance with the same formulae as those of the examples and comparative examples except that the pigment and the dispersant were excluded and only the other ingredients were used. Each of the pigment-free compositions was thoroughly stirred and then visually inspected for any undissolved residue of photopolymerization initiators. The compositions in which no undissolved residue was found were placed in an incubator at 0° C. for 24 hours, then taken out and allowed to stand at room temperature, and visually inspected once again for any deposition of photopolymerization initiators.

The evaluation criteria were as follows. Evaluation results are summarized in Tables 3 and 4. In Tables 3 and 4, "Initiator dissolution" refers to this evaluation item.

A: No undissolved residue of photopolymerization initiators was found after stirring at room temperature and no deposition was observed after storage at 0° C.

B: No undissolved residue of photopolymerization initiators was found after stirring at room temperature, but deposition was observed after storage at 0° C.

C: Undissolved residue of photopolymerization initiators was found after stirring at room temperature. Curability An ink jet recording apparatus having piezoelectric ink jet nozzles was used in this test. Each of the ink compositions of the examples and comparative examples was filled in the individual nozzle rows. At an ordinary temperature and under normal pressure, the ink composition was ejected onto a PVC sheet (Flontlite Grossy 120g [trade name], manufactured by Cooley) to form a solid image (recording resolution: 720×720 dpi) with the amount of ejection controlled so that the thickness of the print (record) should be 10 µm. All ink compositions could be smoothly ejected. The solid image was then cured by irradiation with ultraviolet radiation emitted from UV-LEDs housed in the ultraviolet irradiation unit located next to the carriage. The peak radiation intensity was 1 W/cm² (1000 mW/cm²), the wavelength of an emission peak was 395 nm, the energy of radiation was 200 mJ/cm² per pass, and the pass count was increased until a tack-free state was achieved. In this way, records were prepared each composed of a PVC sheet and a solid image printed thereon.

The solid image represents an image having all of its pixels (the smallest unit of picture defined by the recording resolution) occupied by dots. The pass count refers to the number of times the head moved with respect to the record and emitted ultraviolet radiation from its ultraviolet irradiation unit toward the coating. The energy of radiation [mJ/cm²] was calculated as the product of the radiation intensity [mW/cm²] of the light source measured on the exposed surface and the duration of exposure [seconds]. The radiation intensity was measured using UM-10 UV radiometer and UM-400 receptor head (both manufactured by KONICA MINOLTA SENSING, INC.).

The criteria for the tack-free state were whether the ink composition adhered to a cotton swab and whether the cured product on the recording medium could be damaged by scratches. When scratching with a cotton swab removed no ink composition and left no damage to the cured product on the recording medium, the solid image was judged to be in a tack-free state. The cotton swabs used were Johnson's cotton buds, manufactured by Johnson & Johnson®. Each solid image was scratched by 10 rounds of back-and-forth rubbing at a load of 100 g.

The evaluation criteria for curability were based on the pass count required to achieve a tack-free state and were as follows. Evaluation results are summarized in Tables 3 and 4.
A: 1 pass
B: 2 or 3 passes
C: 4 or more passes 5. Weather Resistance Each of the records prepared in 4. Curability was put into SX75 xenon fade meter (Suga Test Instruments Co., Ltd.) and irradiated with light until the cumulative radiation energy reached 100 MJ/m². The OD value was measured before and after the irradiation period, and the percent persistence of OD was calculated by the following formula:

Percent persistence of OD=OD before irradiation/OD after irradiation×100.

The evaluation criteria were as follows. Evaluation results are summarized in Tables 3 and 4.
A: The percent persistence of OD is ≥80%.
B: The percent persistence of OD is ≥60% to <80%.
C: The percent persistence of OD is <60%.

TABLE 3

| Evaluation item | Example 1 | Example 2 | Example 3 | Example 4 | Example 5 | Example 6 | Example 7 | Example 8 | Example 9 |
|---|---|---|---|---|---|---|---|---|---|
| Curability | A | A | A | A | A | A | A | A | B |
| Viscosity | A | A | A | A | A | A | A | A | A |
| Storage stability | A | A | A | B | B | A | A | A | A |
| Initiator dissolution | A | A | A | A | B | A | A | A | A |
| Weather resistance | A | A | A | A | A | A | A | A | A |

TABLE 4

| Evaluation item | Example 10 | Example 11 | Example 12 | Example 13 | Example 14 | Example 15 | Comparative Example 1 | Comparative Example 2 | Comparative Example 3 | Comparative Example 4 |
|---|---|---|---|---|---|---|---|---|---|---|
| Curability | B | A | B | B | A | A | C | C | A | A |
| Viscosity | B | B | B | B | A | A | C | B | A | A |
| Storage stability | B | A | A | C | C | B | A | A | D | A |
| Initiator dissolution | B | A | A | A | C | B | A | A | A | A |
| Weather resistance | A | A | A | A | A | A | A | A | A | C |

As can be seen from these results, the ink compositions containing a vinyl-ether-containing (meth)acrylate represented by general formula (I), C.I. Pigment Yellow 155, and photopolymerization initiators (examples) were superior to the other ink compositions (comparative examples) in all of curability, storage stability, and weather resistance as well as smoothness and the dissolution of the photopolymerization initiators contained therein. As a confirmatory test, the curability test described above was repeated with the ink composition of Example 1 under the same conditions except that the peak radiation intensity was reduced to 500 mW/cm$^2$ by attaching a filter to the UV-LEDs while the energy of radiation was maintained at 200 mJ/cm$^2$ per pass by decreasing the carriage speed and thereby extending the duration of exposure per pass. The ink composition was ranked B in terms of curability, and the solid image made using it had wrinkles.

The entire disclosure of Japanese Patent Application No.: 2011-263446, filed Dec. 1, 2011 and 2012-024889, filed Feb. 8, 2012 are expressly incorporated by reference herein.

What is claimed is:

1. A light-curable ink composition for ink jet recording comprising a coloring material, a polymerizable compound, a polymerization and a photopolymerization initiator, wherein the coloring material contains at least C.I. Pigment Yellow 155, and the polymerizable compound contains at least a vinyl-ether-containing (meth)acrylate represented by general formula (I) below, with the vinyl-ether-containing (meth)acrylate present in an amount of 10 to 67% by mass based on a total mass of the ink composition:

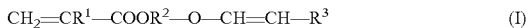
$$CH_2=CR^1-COOR^2-O-CH=CH-R^3 \quad (I)$$

(where $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms), wherein the polymerizable compound further contains a monofunctional (meth)acrylate, other than the vinyl-ether-containing (meth)acrylate, having either an aromatic skeleton or an alicyclic skeleton present in an amount of 10 to 60% by mass based on the total mass of the ink composition.

2. The light-curable ink composition for ink jet recording according to claim 1, wherein the monofunctional (meth)acrylate has an aromatic skeleton.

3. The light-curable ink composition for ink jet recording according to claim 1, wherein the vinyl-ether-containing (meth)acrylate is present in an amount of 10 to 40% by mass relative to the total mass of the ink composition.

4. The light-curable ink composition for ink jet recording according to claim 1, wherein the monofunctional (meth) acrylate is at least either one of phenoxy ethyl (meth)acrylate and benzyl (meth)acrylate.

5. The light-curable ink composition for ink jet recording according to claim 1, wherein C.I. Pigment Yellow 155 is present in an amount of 0.1 to 3% by mass relative to the total mass of the ink composition.

6. The light-curable ink composition for ink jet recording according to claim 1, wherein the photopolymerization initiator contains at least an acylphosphine oxide.

7. An ink jet recording method comprising
ejecting the light-curable ink composition for ink jet recording according to claim 1 onto a recording medium and
curing the ejected light-curable ink composition for ink jet recording by irradiation with ultraviolet radiation having an emission peak at a wavelength in the range of 350 to 420 nm.

8. The ink jet recording method according to claim 7, wherein the ultraviolet radiation used to cure the light-curable ink composition for ink jet recording has an energy of radiation equal to or lower than 600 mJ/cm$^2$.

9. The ink jet recording method according to claim 7, wherein the ultraviolet radiation used to cure the light-curable ink composition for ink jet recording has a peak radiation intensity equal to or higher than 800 mW/cm$^2$.

10. An ink jet recording method comprising
ejecting the light-curable ink composition for ink jet recording according to claim 2 onto a recording medium and
curing the ejected light-curable ink composition for ink jet recording by irradiation with ultraviolet radiation having an emission peak at a wavelength in the range of 350 to 420 nm.

11. An ink jet recording method comprising
ejecting the light-curable ink composition for ink jet recording according to claim 3 onto a recording medium and
curing the ejected light-curable ink composition for ink jet recording by irradiation with ultraviolet radiation having an emission peak at a wavelength in the range of 350 to 420 nm.

12. An ink jet recording method comprising
ejecting the light-curable ink composition for ink jet recording according to claim 4 onto a recording medium and
curing the ejected light-curable ink composition for ink jet recording by irradiation with ultraviolet radiation having an emission peak at a wavelength in the range of 350 to 420 nm.

13. An ink jet recording method comprising
ejecting the light-curable ink composition for ink jet recording according to claim 5 onto a recording medium and
curing the ejected light-curable ink composition for ink jet recording by irradiation with ultraviolet radiation having an emission peak at a wavelength in the range of 350 to 420 nm.

14. An ink jet recording method comprising
ejecting the light-curable ink composition for ink jet recording according to claim 6 onto a recording medium and
curing the ejected light-curable ink composition for ink jet recording by irradiation with ultraviolet radiation having an emission peak at a wavelength in the range of 350 to 420 nm.

* * * * *